United States Patent
Pearce et al.

(10) Patent No.: US 7,381,669 B2
(45) Date of Patent: *Jun. 3, 2008

(54) HYDROENTANGLED FILTER MEDIA AND METHOD

(75) Inventors: Charles Eric Pearce, Charlotte, NC (US); Sergio DeLeon, Clayton, NC (US); Michael Putnam, Fuquay-Varina, NC (US); Cheryl Carlson, Willow Springs, NC (US); Ping Hao, Charlotte, NC (US)

(73) Assignee: Polymer Group, Inc., Charlotte, NC (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/328,305

(22) Filed: Jan. 9, 2006

(65) Prior Publication Data

US 2006/0111004 A1    May 25, 2006

Related U.S. Application Data

(63) Continuation of application No. 10/050,413, filed on Jan. 16, 2002, now Pat. No. 7,015,158.

(60) Provisional application No. 60/262,229, filed on Jan. 17, 2001.

(51) Int. Cl.
*D04H 1/46* (2006.01)
*D04H 3/10* (2006.01)
*D04H 5/02* (2006.01)

(52) U.S. Cl. .......... 442/408; 442/57; 442/356; 442/357; 442/387; 428/359; 428/365

(58) Field of Classification Search ............... 442/408, 442/415
See application file for complete search history.

(56) References Cited

U.S. PATENT DOCUMENTS

| | | | | |
|---|---|---|---|---|
| 4,556,601 A | * | 12/1985 | Kirayoglu | 428/219 |
| 5,171,339 A | | 12/1992 | Forsten | |
| 5,240,764 A | * | 8/1993 | Haid et al. | 442/408 |

OTHER PUBLICATIONS

Lindblom, P. et al., "An Alternative Nonwoven Fabric To Needlefelt For Baghouse Filtration," 14th Annual Techn. Conf.—Amer. Filtration & Separ. Soc., May 1-4, 2001, pp. 1-20, Tampa, FL, USA.

* cited by examiner

*Primary Examiner*—N. L. Torres-Velazquez
(74) *Attorney, Agent, or Firm*—Kilyk & Bowersox, PLLC; Valerie Calloway

(57) ABSTRACT

A filter media formed in accordance with the present invention comprises hydroentangled, predominantly polyester staple length fibers having a basis weight of no more than about 12 oz/yd$^2$. The filter media exhibits a Mullen burst strength of at least about 395 psi, and machine-direction and cross-direction shrinkage of less than about 3%, preferably less than about 2%. The filter media exhibits a machine-direction tensile strength of at least about 105 lb/in, and a cross-direction tensile strength of at least about 110 lb/in.

10 Claims, 2 Drawing Sheets

HYDROENTANGLED FILTER MEDIA AND METHOD

CROSS-REFERENCE TO RELATED APPLICATION

This application is a continuation of U.S. Ser. No. 10/050,413, filed Jan. 16, 2002, now U.S. Pat. No. 7,015,158 B2, which claims the benefit of priority Provisional Application No. 60/262,229, filed Jan. 17, 2001, the disclosures of which are incorporated herein by reference.

TECHNICAL FIELD

The present invention relates generally to a nonwoven fabric employed as a filter media, and more particularly to a filter media comprising a hydroentangled nonwoven fabric, and a method of making the filter media through the use of a formaninous surface.

BACKGROUND OF THE INVENTION

Filtration of fluids such as gases requires the removal of typically particulate or disparate impurities from the gas stream in order to limit introduction of the impurities into the environment, or circulation back into the associated process. It is ordinarily desirable to maximize the surface area available for filtration so as to remove large amounts of undesirable contaminants from the fluid stream, while maintaining the operating pressure differential induced by the filter as low as possible to achieve long service life and minimize surface strain.

One form of filtration is typically referred to as interception, that is, the filter media functions in the nature of a sieve that mechanically entraps particles larger than the pore size inherent to the media. Larger particles are removed from the fluidic stream by the openings in the filter media, with particles building on top of one another to create a filter cake that removes successively smaller particles.

More specifically, in a so-called "baghouse filter", particulate material is removed from a gaseous stream as the stream is directed through the filter media. In a typical application, the filter media has a generally sleeve-like tubular configuration, with gas flow arranged so as to deposit the particles being filtered on the exterior of the sleeve. In this type of application, the filter media is periodically cleaned by subjecting the media to a pulsed reverse-flow, which acts to dislodge the filtered particulate material from the exterior of the sleeve for collection in the lower portion of the baghouse filter structure. U.S. Pat. No. No. 4,983,434, hereby incorporated by reference, illustrates a baghouse filter structure and a prior art filter laminate.

Heretofore, nonwoven fabrics have been advantageously employed for manufacture of filter media. Generally, nonwoven fabrics employed for this type of application have been entangled and integrated by mechanical needle-punching, sometimes referred to as "needle-felting", which entails repeated insertion and withdrawal of barbed needles through a fibrous web structure. While this type of processing acts to integrate the fibrous structure and lend integrity thereto, the barbed needles inevitably shear large numbers of the constituent fibers, and undesirably create perforations in the fibrous structure, which act to compromise the integrity of the filter and can inhibit efficient filtration. Needle-punching can also be detrimental to the strength of the resultant fabric, requiring that a suitable nonwoven fabric have a higher basis weight in order to exhibit sufficient strength for filtration applications.

U.S. Pat. No. 4,556,601 to Kirayoglu discloses a hydroentangled, nonwoven fabric, which may be used as a heavy-duty gas filter. This filtration material however, cannot be subjected to a shrinkage operation. Exposure of the described fabric to a shrinkage operation is believed to have a negative effect on the physical performance of the filtration material.

The present invention is directed to a filter media, and method of making, which is formed through hydroentanglement, thus avoiding the deleterious effects of mechanical needling, while providing a filter media having the requisite strength characteristics, without possessing a limiting factor in performance. The filtration media of the present invention also demonstrates a highly desirable uniformity for cost-effective use.

SUMMARY OF THE INVENTION

A filter media formed in accordance with the present invention comprises hydroentangled, predominantly polyester staple length fibers having a basis weight of no more than about 12 oz/yd$^2$. The filter media exhibits a Mullen burst strength of at least about 395 psi, and machine-direction and cross-direction shrinkage of less than about 3%, preferably less than about 2%. The filter media exhibits a machine-direction tensile strength of at least about 105 lb/in, and a cross-direction tensile strength of at least about 110 lb/in.

The present filter media is formed by providing a precursor web comprising predominantly staple length polyester fibers. The present method further comprises providing a foraminous surface, which may be configured to impart a repeating pattern to the filter media being formed for enhancing its filtration capabilities. The precursor web is positioned on the foraminous surface, and hydroentangled to form the present filter media in the form of a nonwoven fabric.

It is within the purview of the present invention that the filter media be heat-set subsequent to hydroentangling. By the inclusion of fusible fibers in the precursor web, heat-setting of the filter media can desirably result in thermal bonding of the media, thus enhancing the strength characteristics of the material.

Other features and advantages of the present invention will become readily apparent from the following detailed description, the accompanying drawings, and the appended claims.

DETAILED DESCRIPTION

Figure 1:
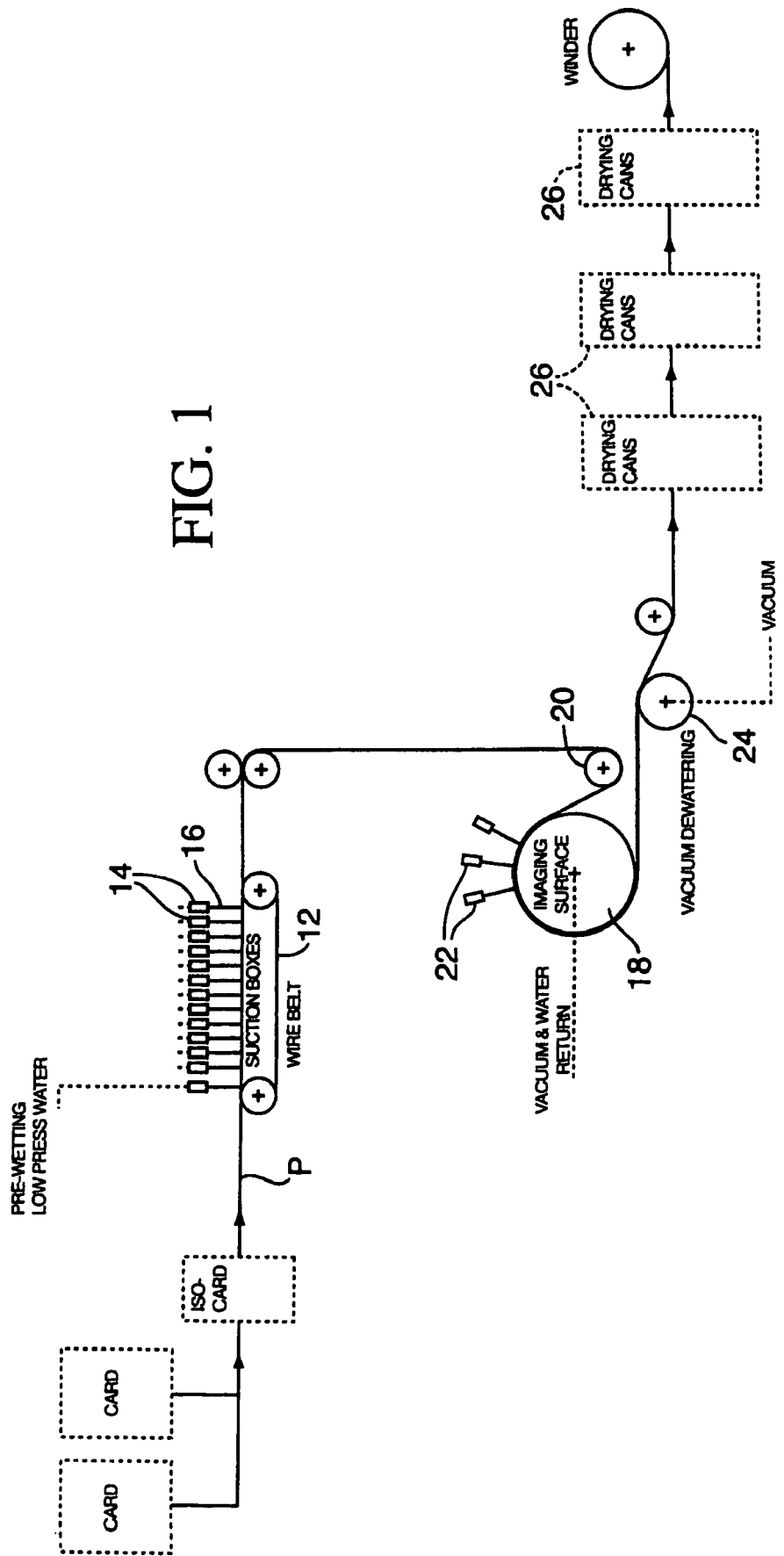
FIG. 1 a diagrammatic view of an apparatus for manufacturing filter media embodying the principles of the present invention.

While the present invention is susceptible of embodiment in various forms, there is shown in the drawings, and will hereinafter be described, a presently preferred embodiments, with the understanding that the present disclosure is to be considered as an exemplification of the invention, and is not intended to limit the invention to the specific embodiments illustrated.

The present invention described herein includes the uses of hydroentangled nonwovens as described below, is a direct replacement for needled felts in all such applications where such materials are currently used. These applications include air filtration in tubular and sheet form, used in air handling, as represented by baghouse stations, liquid filtration systems, and automatic transmission fluid filters, and other specialty applications where needled felts are employed.

With particular reference to FIG. 1, therein is illustrated an apparatus for practicing the method of the present invention for forming a nonwoven fabric. The fabric is formed from a fibrous matrix, which comprises fibers selected to promote economical manufacture. The fibrousmatrix is preferably carded and subsequently cross-lapped to form a precursor web, designated P.

FIG. 1 illustrates a hydroentangling apparatus for forming nonwoven fabrics in accordance with the present invention. The apparatus includes a foraminous-forming surface in the form of a flat bed entangler 12 upon which the precursor web P is positioned for pre-entangling. Precursor web P is then sequentially passed under entangling manifolds 14, whereby the precursor web is subjected to high-pressure water jets 16. This process is well known to those skilled in the art and is generally taught by U.S. Pat. No. 3,485,706, to Evans, hereby incorporated by reference.

The entangling apparatus of FIG. 1 further includes an imaging and patterning drum 18 comprising a foraminous surface for effecting imaging and patterning of the now-entangled precursor web. After pre-entangling, the precursor web is trained over a guide roller 20 and directed to the image transfer device 18, where an image and/or pattern is imparted into the fabric on the foraminous-forming surface of the device. The web of fibers is juxtaposed to the foraminous surface 18, and high pressure water from manifolds 22 is directed against the outwardly facing surface from jet spaced radially outwardly of the foraminous surface 18. The foraminous surface 18, and manifolds 22, may be formed and operated in accordance with the teachings of commonly assigned U.S. Pat. No. 5,098,764, No. 5,244,711, No. 5,822,823, and No. 5,827,597, the disclosures of which are hereby incorporated by reference. It is presently preferred that the precursor web P be given an image and/or pattern suitable to provide fluid management, as will be further described, to promote use of the present nonwoven fabric in filtration media. The entangled fabric can be vacuum dewatered at 24, and dries at an elevated temperature on drying cans 26.

Figure 2:
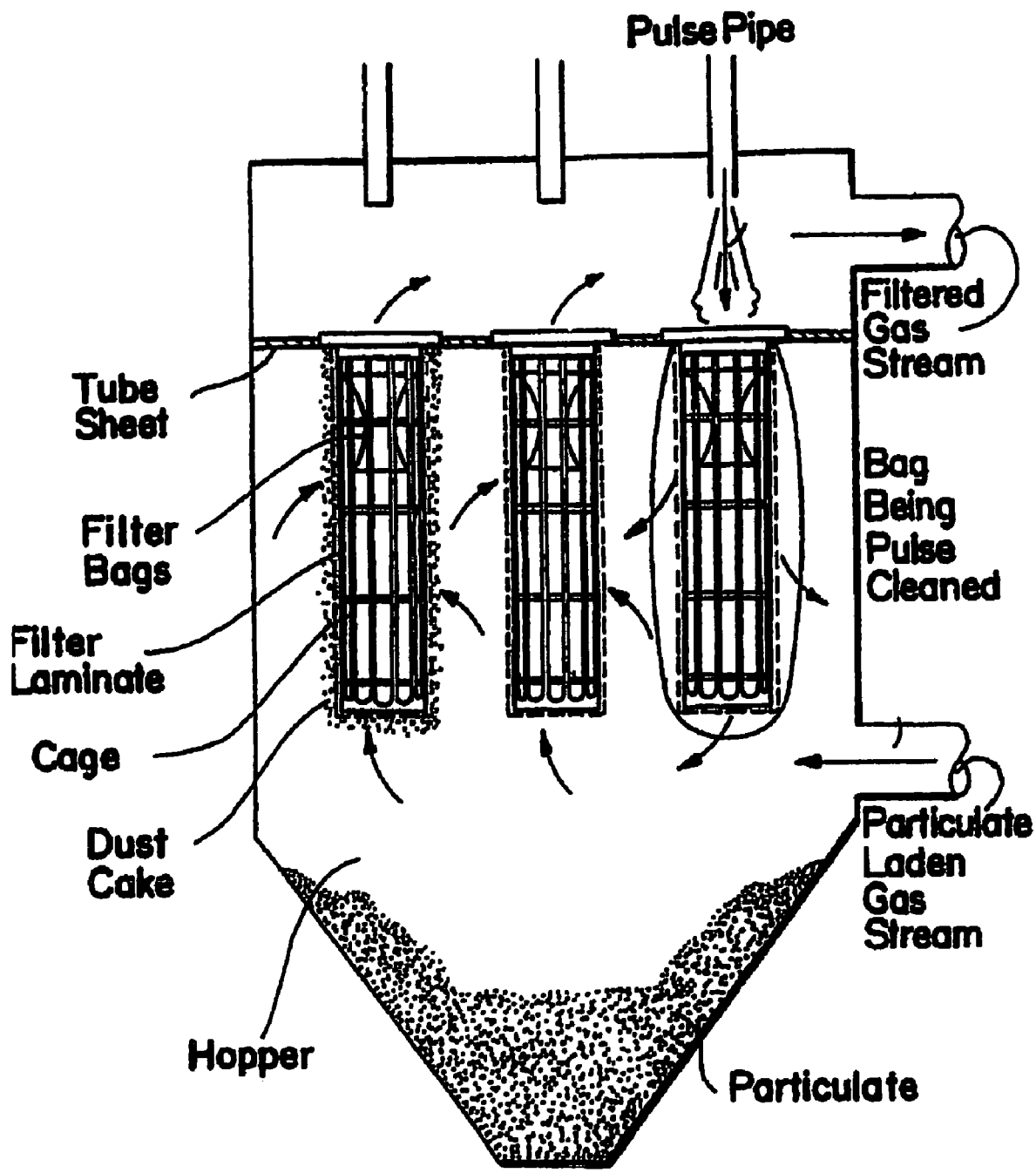
FIG. 2 is a diagrammatic view of a baghouse filter arrangement for which the baghouse filter media of the present invention is particularly suited for use.

With reference to FIG. 2, therein is diagrammatically illustrated a representative baghouse filter structure for use with the filter media of the present invention. This type of baghouse filter structure is typically employed in industrial applications requiring filtration of particulate material from a fluidic stream. As illustrated, the fluidic stream enters a filter chamber, within which, one or more generally tubular, sleeve-like filter bags are arranged. Gas flows through the exterior surface of the filter bags by the creation of a pressure differential across the filter media, with particulate material removed from the gaseous stream as the material lodges against the filter media. Typically, the particulate material is dislodged from the exterior of the filter bags by periodically subjecting each filter bag to pulsed reverse-flow of fluid, whereby the particulate material, typically referred to as filter cake, is forced from the exterior of each filter bag, and collected at a lower portion of the structure.

The baghouse filter media embodying the principles of the present invention may be configured as a filter bag illustrated in FIG. 2. For such applications, the filter media may be formed as a planar sheet, with opposite edges joined to form an open-ended tube. The tube can then be closed at one end to form a sleeve-like bag, as illustrated in FIG. 2. For other applications, the filter media may be employed in its planar form, or in the form of an open-ended tube.

Other potential filtration applications besides baghouse filtration include HVAC filtration, wherein a frame with a filter media is placed in the path of the flow of air to remove particles such as dust from the air before the air is circulated into a room. Food and beverage filtration is another application, whereby a filter may be placed before or after the fluid contacts the beverage making substances in order to remove contaminants from the fluid. Coalescing filtration is yet another application, such as used in diesel engines and marine applications. Coalescing filter media are commonly employed within a frame and housing located either upstream or downstream of the liquid hydrocarbon pump. Still other potential filtration applications include vacuum filter equipment, mist elimination, turbine intake filtration, automotive and truck transmission and air in-take filtration, coolant filtration, chemical filtration, including medical and pharmaceutical filtration, power generation filtration, office equipment filtration, paper machine clothing felt and drain layer filtration, as well as filtration applications.

Filter media embodying the principles of the present invention is formed by hydroentanglement on a foraminous surface, such as disclosed in U.S. Pat. No. 5,244,711, to Drelich et al., hereby incorporated by reference. Depending upon the specific configuration of the foraminous surface, the fibrous material may have a repeating pattern imparted in the plane of the fabric or the repeating pattern may protrude from the plane of the fabric. A foraminous surface for practicing the present invention typically includes a meshed surface such as a screen, or an image transfer device having a pronounced three-dimensional topography whereby the high-pressure liquid (water) streams directed at the fibrous material for hydroentanglement can pass through the foraminous surface.

Formation of a filter media in accordance with the present invention is effected by providing a precursor web of predominantly staple length polyester fibers selected to have a basis weight corresponding to the basis weight of the filter media being formed. In accordance with the present invention, the present filter media preferably has a basis weight of no more than about 12 $oz/yd^2$, thus facilitating efficient fabrication by hydroentanglement, and cost-effective use of the fibrous material from which the media is formed.

Depending upon the composition of the precursor web from which the present filter media is formed, the strength and integrity of the material can be desirably enhanced. By incorporation of fusible fibers, such as sheath fibers or bi-component thermoplastics including polyesters, polyamides, and/or polyolefins, it is possible to effect heat-bonding of the fiber structure during heat-setting of the material, subsequent to hydroentanglement. Further, it has been found that in the absence of specific fusible fibers, heat-setting of the material can desirably enhance the strength and the porosity of the nonwoven fabric to improve its filtration characteristics.

By configuring the foraminous surface employed during hydroentanglement to impart a specifically-configured pattern to the filter media, filtration characteristics of the media can be further enhanced, including an increase in the effective surface area, improvement in filter cleaning efficiency, and to alteration of depth filtration performance. As will be appreciated, this is a distinct advantage in comparison to conventional needle-punched fabrics, which ordinarily cannot be meaningfully imaged in connection with mechanical entanglement. Use of 100% polyester staple length fibers is presently contemplated, as well as use of 90% polyester fibers in combination with 10% fusible sheath fibers. The fabric weight is selected to be no more than about 12 oz/yd$^2$, preferably on the order of about 10 oz/yd$^2$.

Notably, formation of the filter media of the present invention by hydroentanglement has been found to desirably provide the filter media with the requisite strength characteristics, and resistance to shrinkage. Filter media formed in accordance with the present invention is suitable for application in such industries as mining, cement, chemical, iron and steel, utilities, and work with carbon black. The disclosed filter media of the present invention preferably exhibits a Mullen burst strength of at least about 395 psi, with machine-direction and cross-direction shrinkage of less than about 3%, and more preferably, less than about 2%. The filter media preferably exhibits a machine-direction tensile strength of at least about 105 lb/in, and a cross-direction tensile strength of at least about 110 lb/in, in accordance with ASTM D461-93, Section 12.

The accompanying Table sets forth performance characteristics for filter media formed in accordance with the present invention in comparison to a conventional needle-punched nonwoven fabric having a basis weight of 16 oz/yd2, designated and commercially available Menardi 50-575. As the test results indicate, a filter media formed in accordance with the present invention exhibits performance comparable to that achieved with the needle-punched fabric, notwithstanding the significant difference in basis weights of the two fabrics.

From the foregoing, numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

Physical/Performance Properties

| Physicals | Test Method | Scale Worst/Best | Menardi 50-575 Specification | Menardi 50-575 Sample (Apr. 4, 2000) | CLC-135 (Apr. 4, 2000) NL-A2-C-00-098-004- | Manardi 50-575 Sample (Aug. 29, 2000) Tested Oct. 12, 2000 |
|---|---|---|---|---|---|---|
| Fiber Composition | | | PET - 2.25 dpf | PET - 2.25 dpf | PET - T203 | PET |
| Mechanical/Chemical Finish | | | Heatset, Plain Finish | Heat Set, Singed | None | |
| Basis Weight (oz/sy) | ASTM D461-93 se. 11 | | 14.5-16.5 | 15.5 | 10.2 | 16.1 |
| Thickness (mls) | ASTM D461-93 sec. 10 | | 65-85 | 75.6 | 57.75 | 72.4 |
| Frazier Air Permeability (cfm @0.5" H20) | ASTM D461-93 sec. 18 | | 30-45 | 35.6 | 38.8 | 31.4 |
| Jullen Burst (psi) | ASTM D461-93 sec. 13 | More is Better | >400 | | 411 | 538 |
| Tensiles - MD 1" Strip (lb/in) | ASTM D461-93 sec. 12 | More is Better | >75 | 104 | 139.1 | 106.45 |
| Tensiles - CD 1" Strip (lb/in) | ASTM D461-93 sec. 12 | More is Better | >150 | 169 | 110.4 | 192.81 |
| Elongation - MD 1" Strip (%) | ASTM D461-93 sec. 12 | | | 94 | 43.5 | 97 |
| Elongation - CD 1" Strip (%) | ASTM D461-93 sec. 12 | | | 79 | 71.1 | 92 |
| Tensiles - MD GRAB (lb/in) | TM-7012 | More is Better | | 260.14 | | |
| Tensiles - CD GRAB (lb/in) | TM-7012 | More is Better | | 267.84 | 283.43 | 283.37 |
| Elongation - MD GRAB (%) | TM-7012 | | | 58.21 | 207.01 | 405.6 |
| Elongation - CD GRAB (%) | TM-7012 | | | 50.17 | 42.99 | 45.91 |
| Elongation - MD @ 10 lbs/2 in width load (%) | Special Test | Less is Better | <5 | 2.45 | 61.91 | 25.27 |
| Elongation - CD @ 10 lbs/2 in width load (%) | Special Test | Less is Better | <5 | 4.25 | 1.33 | 5.46 |
| Coulter Pore Size Distribution - MFP (microns) | | | | 28 | 5.2 | 5.42 |
| Coulter Pore Size Distribution - Max (microns) | | | | 58 | 19.55 | |
| Very wide spread (>50) of only 2 data points | | | | | 41.43 | |
| PMI Pore Size Distribution - MFP (microns) | | | | 21.83 | 18.07 | 18.08 |
| PMI Pore Size Distribution - Max (microns) | | | | 67.1 | 42.32 | 52.72 |
| PMI Pore Size Distribution - Min (microns) | | | | 1.17 | 1.91 | 1.29 |
| Shrinkage - MD 2 hrs @ 300 F. (%) | | Less is Better | | | 0.5 | 0.5 |
| Shrinkage - CD 2 hrs @ 300 F. (%) | | Less is Better | | | 0 | 0 |
| Shrinkage - MD 24 hrs @ 350 F. (%) | | Less is Better | <3 | | 1.5 | 1 |
| Shrinkage - CD 24 hrs @ 350 F. (%) | | Less is Better | <3 | | 0.5 | 0 |
| Liquid Filtration Efficiency (%) for Coarse Dust | | | | 86.6 | 90.6 | 91.4 |

-continued

Physical/Performance Properties

|  |  |  |  |  |
|---|---|---|---|---|
| Liquid Filtration Life/Weight Gain (min) for Coarse Dust |  | 3.12 | 4.21 | 3.87 |
| Liquid Filtration Life/Weight Gain (%) for Coarse Dust |  | 26.13 | 41.5 | 27 |
| Liquid Filtration Efficiency (%) for Fine Dust |  | 45.43 | 54 | 60.7 |
| Liquid Filtration Life/Weight Gain (min) for Fine Dust |  | 6.6 | 6.06 | 5.51 |
| Liquid Filtration Life/Weight Gain (%) for Fine Dust |  | 27.03 | 44.4 | 22.4 |
| 100 cycles Baghouse Filtration Test (FEMA) from ETS, INC |  |  |  |  |
| Outlet emmissions (mg/m3) | Less is Better | 7.14 | 2.4 | 1.89 |
| Residual DeltaP Change (Pa) | Less is Better | 159.7 | 178.8 | 325.5 |
| Average Residual DeltaP (Pa) | Less is Better | 169.88 | 178.85 | 285.9 |
| Average Cycle Time (seconds) | More is Better | 56 | 66 | 40 |
| Fabric Weight Gain (grams) | Less is Better | 1.15 | 1.26 | 1.37 |
| Mullen Burst (psi) | More is Better | 505 | 395 | 555 |

| Physicals | PH0829 (Aug. 29, 2000) | Manardi 50-57S Sample (Aug. 29, 2000) Tested Nov. 28, 2000 | BHF1030-#1 | BHF1030-#4 (0.676EE) | BHF1030-#5 (140 bar) |
|---|---|---|---|---|---|
| Fiber Composition | PET - T472 1.5 dpf |  | PET - T203 1.5 dpf | PET - T203 1.5 dpf | PET - T203 1.5 dpf |
| Mechanical/Chemical Finish | None |  | None | None | None |
| Basis Weight (oz/sy) | 10.06 |  | 10.2 | 10.2 | 10.16 |
| Thickness (mls) | 65.4 |  | 65.5 | 59.4 | 63 |
| Frazier Air Permeability (cfm @0.5" H20) | 36.6 |  | 42.2 | 38.3 | 41.6 |
| Jullen Burst (psi) | 400 |  | 411 | 394.3 | 405 |
| Tensiles - MD 1" Strip (lb/in) | 126.99 |  | 127.2 | 124.1 | 125.3 |
| Tensiles - CD 1" Strip (lb/in) | 85.5 |  | 123.8 | 120.3 | 121.8 |
| Elongation - MD 1" Strip (%) | 43 |  | 53 | 46.5 | 54 |
| Elongation - CD 1" Strip (%) | 100 |  | 59 | 65.4 | 67 |
| Tensiles - MD GRAB (lb/in) | 289.68 |  | 255.8 | 250.9 | 252.3 |
| Tensiles - CD GRAB (lb/in) | 191.63 |  | 236.6 | 237 | 237.5 |
| Elongation - MD GRAB (%) | 40.73 |  | 33.13 | 31.8 | 32.6 |
| Elongation - CD GRAB (%) | 35.29 |  | 30.44 | 29.8 | 30.5 |
| Elongation - MD @ 10 lbs/ 2 in width load (%) | 2.1 |  |  | 2.4 |  |
| Elongation - CD @ 10 lbs/ 2 in width load (%) | 11.05 |  |  | 2.5 |  |
| Coulter Pore Size Distribution - MFP (microns) |  |  |  |  |  |
| Coulter Pore Size Distribution - Max (microns) |  |  |  |  |  |
| Very wide spread (>50) of only 2 data points |  |  |  |  |  |
| PMI Pore Size Distribution - MFP (microns) | 18.99 | 19.49 |  | 18.49 |  |
| PMI Pore Size Distribution - Max (microns) | 47.53 | 54.87 |  | 43.21 |  |
| PMI Pore Size Distribution - Min (microns) | 2.05 | 1.98 |  | 1.6 |  |
| Shrinkage - MD 2 hrs @ 300 F. (%) | 0.5 |  |  | 0.5 | 0.67 |
| Shrinkage - CD 2 hrs @ 300 F. (%) | 0 |  |  | 0 | 0 |
| Shrinkage - MD 24 hrs @ 350 F. (%) | 1.5 |  |  | 1.5 | 1.5 |
| Shrinkage - CD 24 hrs @ 350 F. (%) | 0.5 |  |  | 0.5 | 0 |
| Liquid Filtration Efficiency (%) for Coarse Dust | 90 | 90.6 |  | 79.6 |  |
| Liquid Filtration Life/Weight Gain (min) for Coarse Dust | 3.88 | 3.17 |  | 6.12 |  |
| Liquid Filtration Life/Weight Gain (%) for Coarse Dust | 40.8 | 25.8 |  | 57.6 |  |
| Liquid Filtration Efficiency (%) for Fine Dust | 71.1 | 60.6 |  | 53.9 |  |
| Liquid Filtration Life/Weight Gain (min) for Fine Dust | 4.81 | 4.45 |  | 7.54 |  |
| Liquid Filtration Life/Weight Gain (%) for Fine Dust | 33 | 22.4 |  | 48.1 |  |

-continued

| Physical/Performance Properties | | | |
|---|---|---|---|
| 100 cycles Baghouse Filtration Test (FEMA) from ETS, INC | | | |
| Outlet emmissions (mg/m3) | 7.8 | 8.08 | 2.53 |
| Residual DeltaP Change (Pa) | 189.1 | 311.2 | 212.5 |
| Average Residual DeltaP (Pa) | 194.4 | 289.8 | 207.4 |
| Average Cycle Time (seconds) | 68 | 38 | 59 |
| Fabric Weight Gain (grams) | 0.96 | 0.89 | 1.1 |
| Mullen Burst (psi) | 425 | 535 | 385 |

What is claimed is:

1. A filter media comprising a heat-set, hydroentangled nonwoven fabric having a basis weight of no more than about 12 oz/yd$^2$ containing at least 90% staple length polyester fibers and devoid of multi-component fusible fibers, and said fabric has machine-direction and cross-direction shrinkage of less than about 3% at 350° F.

2. A filter media in accordance with claim 1, wherein said fabric comprises approximately 100% staple length polyester fibers.

3. A filter media in accordance with claim 1, wherein said filter media exhibits a Mullen burst strength of at least about 395 psi.

4. A filter media in accordance with claim 1, wherein said filter media exhibits machine-direction and cross-direction shrinkage of less than about 2%.

5. A filter media in accordance with claim 1, wherein said heat-set, hydroentangled filter media exhibits a machine-direction tensile strength of at least about 105 lb/in and a cross-direction tensile strength of at least about 110 lb/in.

6. A filter media in accordance with claim 1, wherein said heat-set, hydroentangled filter media is a gas filter.

7. A filter media in accordance with claim 1, wherein said heat-set, hydroentangled filter media is an air filter.

8. A filter media in accordance with claim 1, wherein said heat-set, hydroentangled filter media is a liquid filter.

9. A filter media in accordance with claim 1, wherein the filter media has a thickness of about 58 to about 66 mils.

10. A filter media in accordance with claim 1, wherein the filter media has a Frazier permeability of about 37 to about 42 cfm at 0.5 inch H$_2$O.

* * * * *